US005498879A

United States Patent [19]

De Man

[11] Patent Number: 5,498,879

[45] Date of Patent: * Mar. 12, 1996

[54] APPARATUS FOR THE OPTICAL RECOGNITION OF DOCUMENTS BY PHOTOELECTRIC ELEMENTS HAVING VISION ANGLES WITH DIFFERENT LENGTH AND WIDTH

[75] Inventor: Ivo De Man, Gland, Switzerland

[73] Assignee: Mars Incorporated, McLean, Va.

[ * ] Notice: The portion of the term of this patent subsequent to Apr. 19, 2011, has been disclaimed.

[21] Appl. No.: 229,922

[22] Filed: Apr. 19, 1994

Related U.S. Application Data

[63] Continuation of Ser. No. 957,222, Oct. 6, 1992, Pat. No. 5,304,813.

[30] Foreign Application Priority Data

Oct. 14, 1991 [CH] Switzerland .......................... 03005/91

[51] Int. Cl.$^6$ ...................................................... G06K 5/00

[52] U.S. Cl. ............................ 250/556; 250/226; 356/71

[58] Field of Search .................................... 250/556, 557; 356/71, 444–446; 382/71; 209/534

[56] References Cited

U.S. PATENT DOCUMENTS

| | | | |
|---|---|---|---|
| 3,112,468 | 11/1963 | Kamentsky | 250/556 |
| 3,480,785 | 11/1969 | Aufderheidi . | |
| 3,496,370 | 2/1970 | Haville et al. | 250/556 |
| 4,204,765 | 5/1980 | Iannadrea et al. . | |
| 4,277,774 | 7/1981 | Fujii et al. . | |
| 4,319,137 | 3/1982 | Nakamura et al. . | |

(List continued on next page.)

FOREIGN PATENT DOCUMENTS

| | | |
|---|---|---|
| 0072236 | 2/1983 | European Pat. Off. . |
| 0314312 | 5/1989 | European Pat. Off. . |
| 0338123 | 10/1989 | European Pat. Off. . |
| 2647285 | 4/1976 | Germany . |
| 3705870 | 12/1987 | Germany . |
| 573634 | 3/1976 | Switzerland . |
| 1410823 | 10/1976 | United Kingdom . |
| 2122743 | 1/1983 | United Kingdom . |

OTHER PUBLICATIONS

Armatic Bank–Note AL07 Reader Instruction Manual, (1989).

Armatic Bank–Note Reader AL07 Instruction Manual, (1988), pp. 14–15.

AL07 Engineering Drawings, (undated), 11 sheets.

*Primary Examiner*—Stephone B. Allen

*Attorney, Agent, or Firm*—Davis Hoxie Faithfull & Hapgood

[57] ABSTRACT

An apparatus for the optical recognition of documents (1) extends over the entire width of a transfer plane (3). Regularly disposed photoelectric elements (4), whose optical axes Create a single sensor plane (5) that is perpendicular to transfer plane (3), receive light (7) as altered by document (1). Photoelectric elements (4) are regularly disposed in a manner in which their optical axes are contained in a sensor plane (5) perpendicular to transfer plane (3). A region (8) of document (1), determined by sensor plane (5), is illuminated by at least one light line (9 or 10) which is inclined with respect to sensor plane 5. The light modified by document (1) is received by photoelectric elements (4). The adjacent light sources in each light line (9,10) are separated by a uniform source distance (A), which is smaller than the sensor distance (B) between two adjacent photoelectric elements (4). The light sources emit light within a narrow spectral width in pulses of short duration. Each light source belongs to a color group of a set of color groups, with each source of the same color having the same spectral width. Photoelectric elements (4) convert modified light (7) into electrical sensor signals. optical unit (21) determines a first acceptance angle (α) of photoelectric elements (4). Each of the photoelectric elements (4) has associated with it a second acceptance angle (β) corresponding to a section (29). Each photoelectric element (4) serves to average the light belonging to each section (29).

23 Claims, 2 Drawing Sheets

U.S. PATENT DOCUMENTS 4,488,808 12/1984 Kato .......... 250/556
4,518,856 5/1985 Blackington .......... 250/557
4,587,434 5/1986 Roes et al. .
4,592,090 5/1986 Carl et al. .......... 382/7
4,618,257 10/1986 Bayne et al. .
4,656,462 4/1987 Araki et al. .......... 340/557
4,879,000 11/1989 Gausa .......... 250/556
4,922,109 5/1990 Bercovitz et al. .
5,034,616 7/1991 Bercovitz .
5,304,813 4/1994 De Man .......... 356/71

APPARATUS FOR THE OPTICAL RECOGNITION OF DOCUMENTS BY PHOTOELECTRIC ELEMENTS HAVING VISION ANGLES WITH DIFFERENT LENGTH AND WIDTH

This is a continuation of allowed application Ser. No. 07/957,222 filed Oct. 6, 1992 now U.S. Pat. No. 5,304,813.

FIELD OF THE INVENTION

The invention relates to an apparatus for the optical recognition of documents.

Such apparatus for the optical recognition of documents are used for example in bank note acceptors for the optical recognition of documents.

BACKGROUND OF THE INVENTION

An apparatus for the optical recognition of documents is known from U.S. Pat. No. 4,319,137, in which a printed sheet can be recognized based upon distinctive features printed thereon. An extended source of white light illuminates a small strip, which runs transversely across the sheet. The light which is either reflected by the sheet or is transmitted through it is simultaneously being detected by three photosensors. Each photosensor only registers the light from a narrow spectral range, for instance, in the red, green or blue Solor. For each strip the photosensors transfer three signals corresponding to the three colors to an evaluation system.

German patent document DE-PS 37 05 870 describes a device that can be used as a reading head, which can scan a page line by line. The device includes a row of photodiodes to each of which is assigned a pair of light-emitting-diodes (LED's) which are inclined to each other. Each pair of LED's illuminates the sheet in a region located directly in front of its associated photodiode. A collimator is disposed in front of each photodiode and screens all the light that does not directly originate from the region of the sheet directly in front of the photodiode. The reading head produces a monochromatic raster copy of a printed pattern appearing on the sheet.

It is further known from EP-A 338 123, to create the reading head from a group of interchangeable modules arranged in parallel which include a configuration of rows of photodiodes and light sources that optically scan the sheet in a strip like fashion. Each module operates with light of a predetermined color, and produces the signals associated with a monochromatic raster copy of the printed pattern appearing on the sheet.

Finally, from Swiss patent document CH-PS 573 634, a device is known for scanning a sheet with a single photosensor. In such a device, a small circular area on the sheet is sequentially illuminated by single light sources of different spectral color that are disposed at an angle with the plane of the page, the light sources periodically altering the color of illumination. In synchronism with the cyclic illumination of the area, the single photosensor receives light in the particular spectral region that has been scattered into it in a direction perpendicular to the plane of the sheet. Displacing the sheet after each cycle leads to scanning a small strip on the sheet.

In all the foregoing systems, the disposition of the light sources and photosensors with respect to the plane of the sheet is such that no directly reflected light from the surface of the sheet ever reaches the photosensors. This is a characteristic feature of these systems.

OBJECT OF THE INVENTION

The object of the invention is to create a cost effective system for the optical recognition of documents, that would enable reliable detection of colored distinctive features that may appear on the surface of a document.

Advantageous embodiments will be presented hereunder.

SUMMARY OF THE INVENTION

The object of the invention is achieved in an apparatus for the optical recognition of documents which extends over the entire width of a transfer plane. Regularly disposed photoelectric elements, whose optical axes create a single sensor plane that is perpendicular to a transfer plane, receive light as altered by the document. The photoelectric elements are regularly disposed in a manner in which their optical axes are contained in a sensor plane perpendicular to the transfer plane. A region of the document, determined by the sensor plane, is illuminated by at least one light line which is inclined with respect to the sensor plane. The light modified by the document is received by the photoelectric elements. The adjacent light sources in each light line are separated by a uniform source distance, which is smaller than the sensor distance between two adjacent photoelectric elements. The light sources emit light within a narrow spectral width in pulses of short duration. Each light source belongs to a color group of a set of color groups, with each source of the same color having the same spectral width. The photoelectric elements convert the modified light into electrical sensor signals. An optical unit determines a first acceptance angle of photoelectric elements. Each of the photoelectric elements has associated with it a second acceptance angle corresponding to a section. Each photoelectric element serves to average the light belonging to each section.

BRIEF DESCRIPTION OF THE DRAWINGS

In the following the invention will be further clarified by the following figures.

DETAILED DESCRIPTION

Figure 1:
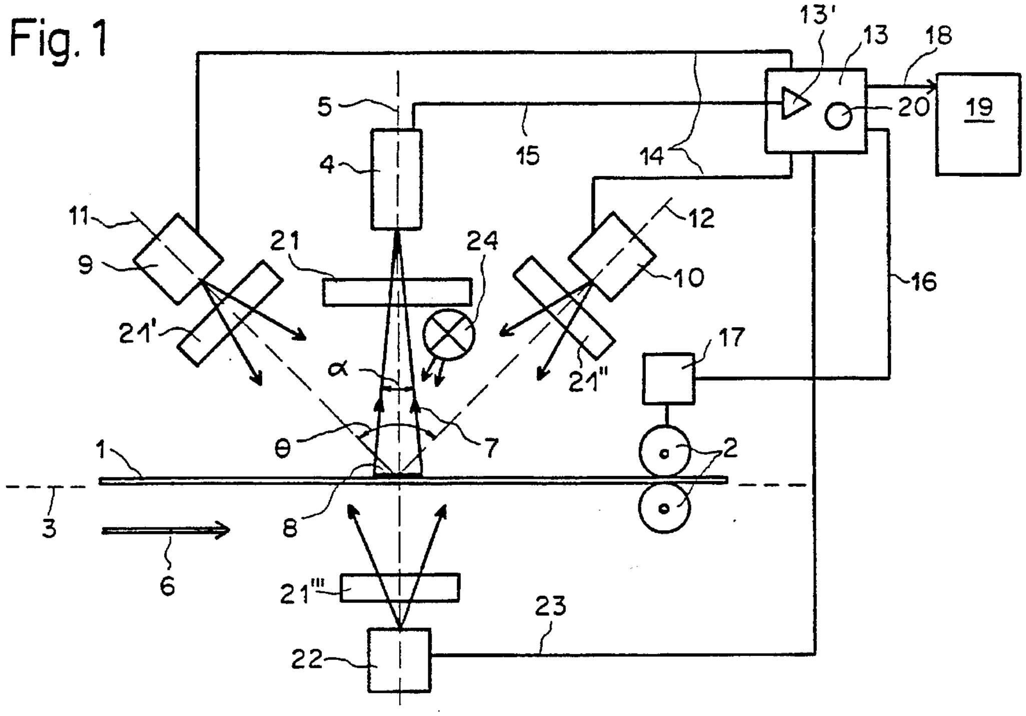
FIG. 1 shows an apparatus for document recognition according to the invention.

In FIG. 1, item 1 represents a document in the form of a sheet of paper containing monochromatic or polychromatic printed characteristic patterns, which are known to appear on e.g. bank notes. Transfer means 2 drives document 1 along the surface of transfer plane 3 that forms part of the apparatus for the recognition of documents. Above transfer plane 3, photosensitive elements e.g. photosensors 4 are disposed whose optical axes are perpendicular to transfer plane 3 and lie in a sensor plane 5 which is perpendicular to the direction of translation 6 of document 1.

Photosensors 4 are at least equidistantly spaced in a row in sensor plane 5, with the row of photosensors 4 being located at a predetermined distance from translation plane 3.

Photosensors 4 serve the function of converting light 7 having a broad spectral range into electrical signals. The spectral range encompasses for instance wavelengths of 0.4 μm to 10 μm, as is e.g. the case for semiconductor silicon photoelements. Light 7 can for instance be scattered by document 1. Photosensors 4 present an acceptance angle α for incident light 7 and determine thereby the width of a region 8 on document 1 which stretches as a narrow strip over essentially the entire width of document 1. The strip is oriented transversely to the direction of transfer. As a result, when translation means 2 drives document 1 along direction 6, region 8 sweeps over entire document 1.

Region 8 is illuminated by at least one line, and preferably by two lines of light 9,10 symmetrically disposed and composed of light sources. The optical axes of the light sources in a line of light 9 or 10 respectively lie in a light plane 11 or 12 respectively. The light planes 11,12 intersect at an angleθ at the common line of intersection between transfer plane 3 and sensor plane 5. The latter plane divides in half the angle θ enclosed by light planes 11 and 12.

The light sources in the two light lines 9 and 10 are equidistantly separated. Light lines 9 and 10 are themselves equidistantly separated from transport plane 3 and are symmetrically separated from plane 5. The light sources of both light lines 9,10 jointly illuminate at least region 8. The middle incident angle generated by the light sources and illuminating document 1 is θ/2. It is dimensioned so that, on the one hand, no directly reflected light reaches photosensors 4 irrespective of the structure of the surface of document 1, and so that on the other hand, the system is insensitive to small distance variations between documents and transfer plane 3. The latter feature may prove to be advantageous for the reading of crumpled documents.

A controller 13 is connected by means of supply lines 14 with the light sources of light planes 11,12. Each of signal lines 15 connects controller 13 with photosensors 4. A drive line 16 provides a connection between controller 13 and a drive 17 of translation means 2. A signal output terminal of control system 13 is connected by a data line 18 with a data input terminal of an evaluation unit 19.

Controller 13 is included for energizing the light sources of light lines 11 and 12 and for amplifying and digitizing the sensor signals S. Preferably, controller 13 enables the on/off switching of the light sources for short time duration by means of a timing generator 20 in a manner in which the light sources either individually or in groups are energized in sequence for a predetermined timing interval t and illuminate document 1 in region 8. The timing intervals t are operational steps of the light sources which are a subdivision of a cycle period Z prescribed by timing generator 20. Cycle Z repeats itself, so that for instance during first operational step t1 transfer means 2 displaces document 1 by the width of region 8.

Controller 13 includes for each signal line 15 an input with an amplifier 13', whose gain factor can be adjusted by an external signal. Control system 13 implements the function of digitizing the amplified analog electrical sensor signals S. For each operational step t there appear at the input of associated amplifier 13' through each of signal, lines 15, sensor signals S that are proportional to the light intensity of light 7 received from photosensors 4. Controller 13 amplifies and digitizes for each photosensor 4 the sensor signals S it receives at each operational step, and forwards them in digitized form as numeric words over data line 18 to evaluation-unit 19. Amplifiers 13' can receive over data line 18 predetermined numeric words generated by evaluation unit 19, which function as external signals for adjusting the gain factors.

Timing generator 20 controls drive 17 of transfer means 2. Hence, if e.g. document 1 is moved in transfer direction 6 during a first operational step t1 of cycle period Z, photosensors 4 can then scan a new region 8. For each cycle Z, evaluation unit 19 receives a predetermined number of numeric words which characterize region 8. As soon as document 1 is scanned in the predetermined region 8, evaluation unit 19 compares these numeric words with its own stored numeric words representing predetermined patterns which effectively determine the acceptance or return of document 1.

Optical means 21 can advantageously be disposed in front of photosensors 4, in order to collect the light scattered by document 1 and deliver it to photosensors 4. These functions can be performed largely independently from the optical properties of photosensors 4. Preferably, optical means 21 are cost effective aspheric plastic lenses, or an optically diffractive holographic optical element, that can be engraved into plastic. Materials such as e.g. polyester, polycarbonates, etc. are suitable as plastic materials.

Additional light sources can advantageously increase the resolving power of the apparatus for the optical recognition of documents 1, since scattered light 7 is not the only quantity that can control resolving power, but quantities such as the transparency of document 1 and/or the fluorescence of dyes appearing thereon also do.

A further row of light 22 can be disposed in sensor plane on the side of document 1 not facing photosensors 4, in a manner in which the light sources of light row 22 have their optical axes oriented in sensor plane 5 so as to illuminate region 8 on the side of document 1 not facing photosensors 4.

The light sources of light row 22 are connected with controller 13 by means of supply lines 23. Timing generator 20 controls in incremental operational steps t the switching-on and-off of the light sources of light row 22. Light 7 which emerges as the transmitted light from document 1, is being collected by optical means 21 and applied to photosensor 4. An ultraviolet (u.v.) source of light 24 extending over the entire width of document 1, can be disposed parallel to region 8 on the side of document 1 facing photosensors 4. This u.v. source 24 must of course not obstruct reception of light 7 in photosensor 4. Ultraviolet source 24 is being supplied by a supply line (not shown) from controller 13, so that it is being switched on/off in predetermined clock times during a supplemental operational step t of timing generators 20.

Documents are known having dyes (colorants) located e.g. in the printed pattern, in the paper fibers etc. that fluoresce under ultraviolet light. During illumination, the ultraviolet light that illuminates document 1 is converted into light of longer wavelength 7 by whatever fluorescing dyes may be located in region 8. Photosensors 4 can register the distribution of longer wavelength light 7 in region 8 without additional filter, since photosensors 4 are practically insensitive to the ultraviolet light. The apparatus can thus determine the 5 presence of these fluorescent dyes and their distribution.

Additional optical means such as geometrical optical units 21', 21", 21''' can be used to concentrate on region 8 light emitted by the light sources.

Figure 2:
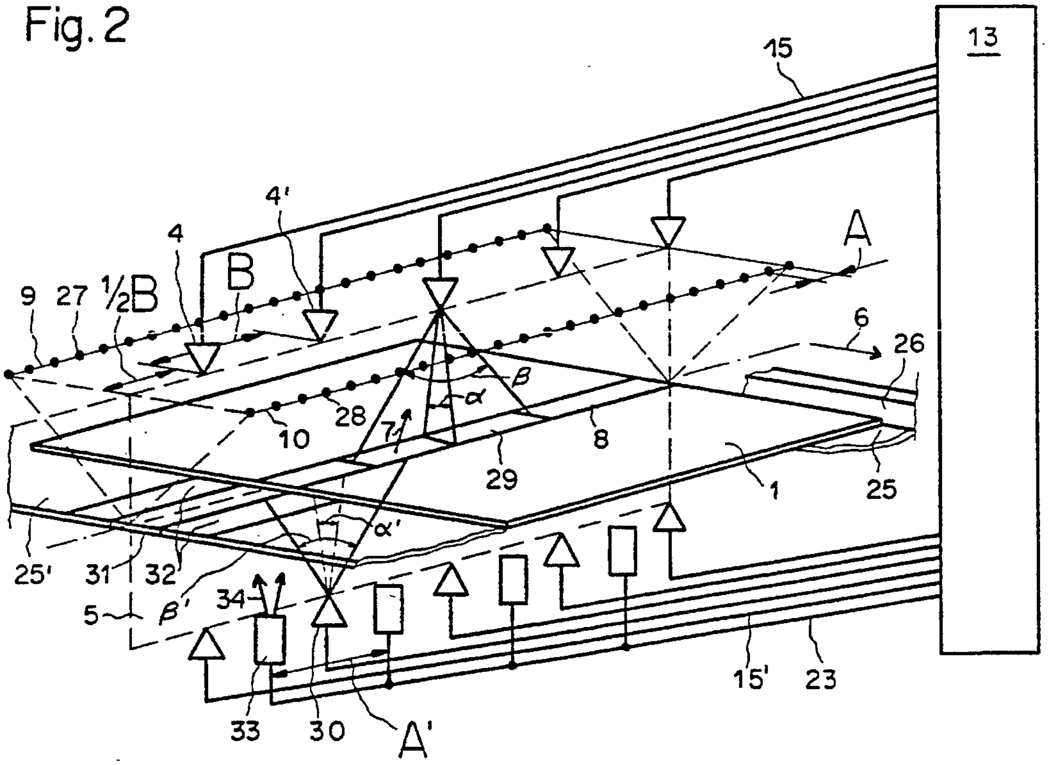
FIG. 2 shows an arrangement of light sources and photosensors according to the invention.

In FIG. 2, a plate 25, 25' creates transfer plane 3 (FIG. 1) and is a section of a conduit bounded by guiding walls 26. Document 1, which is flatly spread out in the conduit and aligned parallel to a guiding wall 26, is translatable in the transfer direction 6. If document 1 is part of a predetermined set of sheets with various dimensions (as is the case e.g. for a bank note from a set of notes of nominal values) the distance between guiding walls 26 adjusts itself to the document 1 having the largest dimensions. Drive means 2 (FIG. 1) drives document 1 through sensing plane 5 under the row of photosensors 4, 4'. The two light lines 9 and 10 are disposed symmetrically to sensor plane 5 in order to illuminate region 8. In the drawing, the light sources of light lines 9, 10 are represented as points. Light lines 9,10 and light row 22 (FIG. 1) can extend over the entire width of the transfer conduit. In both light lines 9 and 10 as well as in light row 22, if present, the optical axes of two adjacent light sources of the same light line 9 or 10 respectively, or of light row 22, are separated by a source distance A or A' respectively. Furthermore, in order to achieve a more uniform illumination, the light sources of one light line 9 are preferably displaced from the light sources of the other light line 10 in a direction perpendicular to transfer direction 6. The light sources are divided in Color groups, which differ from each other by their spectrum of emitted radiation. The radiation of the light sources of a particular color group extends over a narrow, continuous spectral range.

It is advantageous to use LED's 27,28 that are driven with current pulses having a magnitude and duration close to their permissible operational limit, since in this mode of energization the efficiency of LED's 27,28 can be correspondingly increased, without widening the spectral range of radiation. A plurality of color groups are commercially available for LED's 27,28.

The distance of separation between photosensors 4, 4' is maintained constant in a manner in which a sensor distance B is maintained between the optical axes of two adjacent photosensors 4, 4'. Sensor distance B is however a multiple of the source distance A or A' respectively.

The acceptance angle $\beta$ of photosensors 4, 4' measured in sensor plane 5 can be larger than acceptance angle $\alpha$, by a large factor. Optical means 21 (FIG. 1) also determines by its properties the magnitude of acceptance angle $\beta$. Adjacent sensors 4, 4' receive light from overlapping sections 29 and region 8. The same location in region 8 thus simultaneously sends light 7 to several photosensors 4, 4', in such a way that the scattering cross-section of this location, the scattering angle, the distance to photosensor 4 or 4' respectively, are different for each photosensor 4 or 4' respectively, and is already weighted differently by the manner in which photosensors 4, 4' are configured in the system. The amount of overlapping of sections 29 is determined by acceptance angle $\beta$. This arrangement offers the advantage that an analog signal processing operation is already being carried out in photosensors 4,4', this operation being dependant on the predetermined angles $\alpha$ and $\beta$, on the distances A and B, on the distribution of the light sources, and on the color groups being used. All this occurs before the conversion of electrical sensor signals S and their transmission over signal lines 15 to controller 13 takes place. Acceptance angle $\beta$ reduces advantageously not only the number of photosensors 4,4' that are necessary for recognizing document 1, but it also reduces the evaluation time needed for recognizing document 1. Furthermore, the mechanical demands in the present state of the art, for an accurate lateral alignment of document 1 in the transfer conduit are smaller, without impairing the ability of recognizing document 8.

With thin documents 1, a fraction of the radiation from both light lines 9,10 can penetrate through the document in the region 8. As a further distinctive feature the transmission properties of document 1 can advantageously be determined by including a further row of photosensitive elements, e.g. photodetectors 30. The latter are disposed in sensor plane 5 on the side of document 1 not facing light rows 9,10. As an example, the row of photodetectors 30 in sensor plane 5 creates an image of the row of sensors 4,4' mirrored by transfer plane 3.

In plate 25,25' a window 31 is provided at least in the region of sensor plane 5. The window is transparent to radiation, has a width equal to the width of region 8 along transfer direction 6, and is oriented across the width of the transfer conduit. It is furthermore made of some transparent material that is inserted flush into plate 25,25', in order to avoid an accumulation of fibers and similar objects in window 31. By preference, there are disposed between window 31 and photodetectors 30, optical means 21 which implement the predetermined acceptance angles $\alpha$, $\beta$ of photodetectors 30 Window 31 and optical means 21 located in front of photodetectors 30 can be combined into a single unit.

Signal lines 15' connect each photodetector 30 with controller 13. The electrical sensor signals S of photodetectors 30 and of photosensors 4,4' are being processed in controller 13 and supplement the numeric word that characterizes region 8. Preferably, the total length of the row of photosensitive elements 4,4' 30 is shorter than the total length of light lines 9,10 and light row 22 by e.g. half a sensor distance B at both ends. A sufficient illumination of region 8 is thereby assured in the transfer conduit even for the widest document 1, and the two most remote photosensitive elements 4,4' 30 collect relevant data pertaining to document 1.

Plate 25,25' indicates two scattering elements 32 which are covered by a white diffuse scattering substance (e.g. titanium dioxide), and which border window 31 located in the transfer conduit. The two scattering elements 32 scatter diffusively the light of light lines 9,10 into photosensors 4, 4'. The measured values obtained from scattering elements 32 enable a compensation for the changed sensitivity of the system due to aging effects or temperature fluctuations. Directly before the arrival of document 1, an entire period of cycle Z of timing generator (20) (FIG. 1) has elapsed and sensor signals obtained from the two scattering elements 32 are stored in evaluation unit 19 (FIG. 1), as reference numeric words. The latter can e.g. serve as preset values of the gain factor of each individual amplifier 13' (FIG. 1) of controller 13.

If document 1 is narrower than the distance between guiding walls 26 of the conduit, the light sources also illuminate besides region 8 a section of plate 25,25' containing both scattering elements 32. Inasmuch as during scanning of document 1 the numeric words are compared with the corresponding numeric words used as reference in evaluation unit 19, it is possible to determine the individual contributions of the illuminated scattering elements 32, and of the illuminated area 8 on document 1.

If the diffuse scattering substance is transparent to infrared light, it is then possible to place the scattering substance on window 31 to function as scattering element 32. During a measurement of document, by transmission through the diffuse scattering substance the infrared light of light row 32 can reach photosensors 4,4' (assuming in this case that the light row 22 generates infrared light).

In a combination of the embodiments described so far, a predetermined number of light sources 33 are disposed in light row 22 whose optical axes lie in sensor plane 5. These light sources 33, when supplied by controller 13 over supply lines 23, illuminate region 8 with perpendicularly incident light beams 34 on the side of document 1 not facing light planes 12. Light 7 which emerges from document 1 and serves as a measure of the transparency of document 1 is being received by photosensors 4,4' and converted into sensor signals S.

Each of the light sources 33 of light row 22 that is inserted between two adjacent photodetectors 30, can e.g. belong to the same color group, so that it becomes advantageous to have light sources 33 generate infrared light 34 for the purpose of a measurement of transparency.

Figure 3:
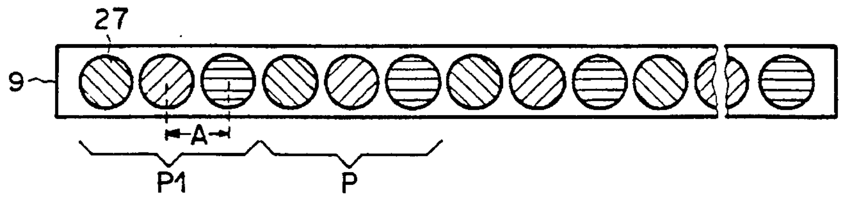
FIG. 3 shows a first configuration of light sources.

As an example, FIG. 3 shows light line 9 with LED's 27 arranged to be separated by a distance A. LED's 27 are hatched according to their spectrum of emission. If for instance LED's 27 belong to the three color groups green, red, yellow, then during a first period P1 of the light sources a green, red and yellow LED 27 will light up in succession. During the subsequent periods P the same sequence of LED 27 emission is being maintained.

During an operational step t of timing generator 20 (FIG. 1), the LED's 27,28 (FIG. 2) of the same color group in the light lines 9,10 (FIG. 2) are being simultaneously energized, in order to assure that region 8 (FIG. 2) be uniformly illuminated with the predetermined color.

Figure 4:
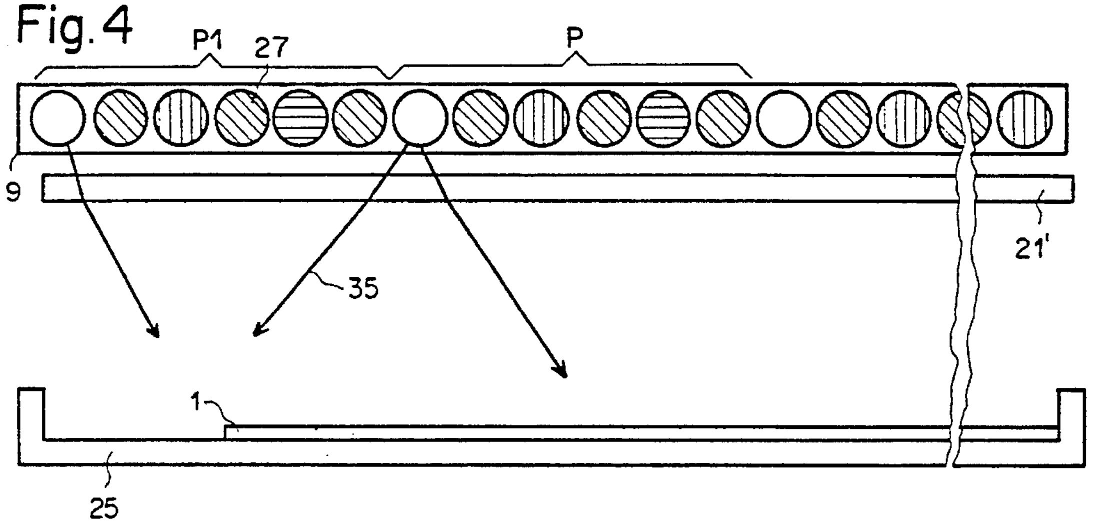
FIG. 4 shows a second configuration of light sources.

FIG. 4 shows for instance light row 9 whose LED's 27 belong to the color groups infrared, red, yellow and green. Some of the LED's 27 belong to a color whose emission is weaker than LED's of a different color. In order to assure that region 8 be illuminated by each color group with equal intensity, the LED's of the different color groups are lined up in e.g. light line 9 such that the weaker LED's 27 (shown in the drawing by an oblique hatch) are located more often or at a higher frequency than the other LED's for a particular LED's alignment cycle. For instance, since the green, LED's 27 for equal power consumption are less bright than the yellow, red, or infrared LED's, the green LED's 27 are shown in the drawing to appear more often than the other groups. During a period P1 of LED's 27 for instance the colors are lined up as infra red-green-yellow-green-red-green, with the same sequence appearing in subsequent similar periods P.

Periods P of light lines 9,10 or of light row 22 respectively, can be shifted in phase with respect to each other.

Between LED's 27 and plate 25 there is arranged geometrical optics optical element 21' which effects a uniform distribution of light intensity in region 8 (FIG. 1) of document 1 despite the fact that the light is generated by many quasi-point-like light sources of the same color group. Preferably, an optically diffractive element can be utilized as a geometrical optical element 21', because the optical properties that depend on the wavelengths of light beam 35 can be optimally adapted to the spatial distribution of the LED's 27 of the various color groups.

Figure 5:
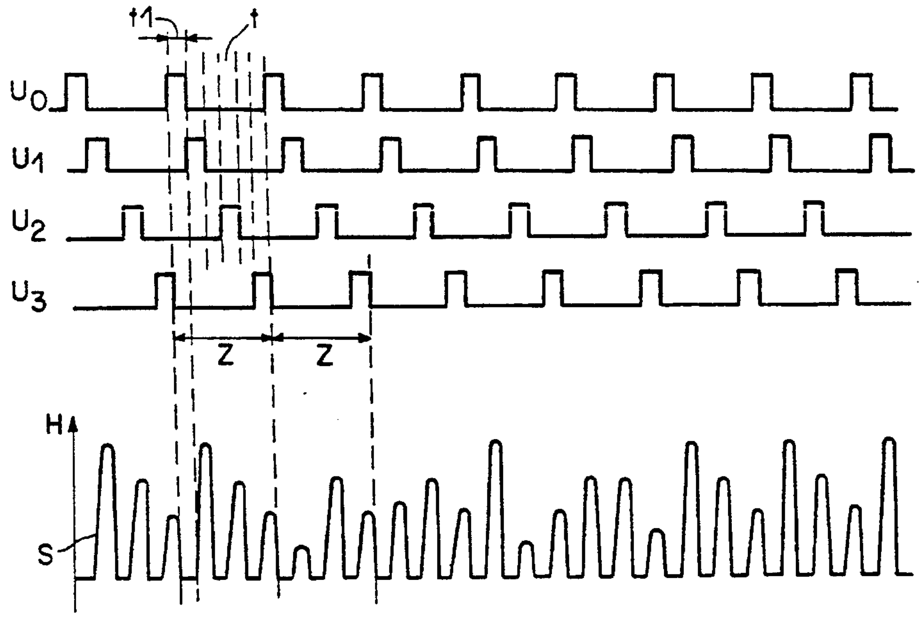
FIG. 5 shows variations of voltage supplies as a function of time.

FIG. 5 shows in relation to FIG. 1 timing diagrams of supply voltage $U_o$ on drive line 15, of the supply voltage U1–U3 on voltage supply line 14 or supply 23 respectively, and of sensor signal S on one of signal lines 15, 15' (FIG. 2). In the first operational step $t_l$ of cycle Z, drive 17 is switched on for displacing document 1. In the next three operational steps t of cycle Z the three supply voltages US–U3 are supplied, in incremental time periods, to the light sources of the three color groups. The next cycle Z follows thereafter. Sensor signal S follows the intensity of light 7 in a manner in which the relative height H of sensor signal S is a function of the local reflectivity or transmission (as the case may be) of document 1 under the illumination of the particular color group at hand.

Finally, the embodiments of the invention described in the foregoing are merely illustrative. Numerous alternative embodiments may be devised by one skilled in the art without departing from the scope of the following claims.

I claim:

1. Apparatus for the optical recognition of documents comprising:

a transport system for transferring a document having a document transfer plane on which said document is placed, said transfer plane geometrically dividing the space in which it is contained into a first semi-space and a second semi-space;

a first plurality of photoelectric elements in said first semi-space arranged in a spaced apart arrangement to sense light reflected from a zone across said transfer plane;

a plurality of light sources in said first semi-space arranged for illuminating said zone, said plurality of light sources being subdivided according to their emission spectra into different color groups;

a second plurality of photoelectric elements in said second semi-space arranged in a spaced apart arrangement to sense light transmitted through a zone across said transfer plane from said plurality of light sources;

an energizing circuit for energizing said light sources; and an evaluation unit for processing sensor signals received from said photoelectric elements;

wherein light reflected from said document to said first plurality of photoelectric elements is gathered under a first vision angle (α) which determines the width of said zone, and is gathered under a second vision angle (β) which determines the length within said zone seen by each photoelectric element and further wherein light from a region of said zone at least partially overlaps at least one other region of said zone from which light is sensed by another photoelectric element.

2. The apparatus of claim 1 in which the shortest distance between said light sources is smaller than the shortest distance between said photoelectric elements.

3. The apparatus of claim 1 wherein said light sources of said color groups are periodically ordered with a periodicity that is a function of their light emission intensity, thereby achieving a uniform illumination of said strip region.

4. The apparatus of claim 1 further comprising optics disposed in front of said photoelectric elements, for admitting light within said vision angles (α, β).

5. The apparatus of claim 1 further comprising a geometrical optical system disposed in front of said light sources for improving the illumination of said zone.

6. The apparatus of claim 1 wherein the second vision angle (β) is greater than the first vision angle (α).

7. The apparatus of claim 1 wherein the color groups of said light sources are illuminated in sequence.

8. The apparatus of claim 1 wherein the light sources are subdivided according to their emission spectrum into different color groups.

9. The apparatus of claim 1 further comprising radiation sources used as light sources and disposed in said second semi-space, so as to effect a two sided illumination of said document.

10. The apparatus of claim 9 wherein at least some of the radiation sources are infrared light sources.

11. The apparatus of claim 1 wherein said light sources are ordered in at least 3 periodically alternating color groups.

12. The apparatus of claim 11 further comprising an ultraviolet radiation source disposed in one of said semi-spaces.

13. The apparatus of claim 1 wherein strips across the transfer plane adjacent to the sides of said zone are covered with a scattering material.

14. The apparatus of claim 13 wherein said zone of said transfer plane is covered with a scattering material.

15. A banknote validator comprising:

a linear array of light sources, comprising a plurality of sub-arrays of light sources of different colors;

a linear array of photosensors arranged to receive light reflected by said document from said light sources;

a linear array of photosensors arranged in correspondence with said light sources for receiving light transmitted through said document from said light sources; and a transport system for moving said document past said linear arrays.

16. Apparatus for the optical recognition of documents comprising:

a transport system for transferring a document having a document transfer plane on which said document is placed, said transfer plane geometrically dividing the space in which it is contained into a first semi-space and a second semi-space;

a first plurality of photoelectric elements in said first semi-space arranged in a spaced apart arrangement to sense light reflected from a zone across said transfer plane;

a plurality of light sources in said first semi-space arranged for illuminating said zone, said plurality of light sources being subdivided according to their emission spectra into different color groups;

a second plurality of photoelectric elements in said second semi-space arranged in a spaced apart arrangement to sense light transmitted through a zone across said transfer plane from said plurality of light sources;

an energizing circuit operatively connected to said light sources; and an evaluation unit for processing sensor signals received from said photoelectric elements;

wherein light reflected from said document to said first plurality of photoelectric elements is gathered in at least two adjacent photoelectric elements under a first vision angle (α) which determines the width of said zone and is gathered under a second vision angle (β) which determines the length within said zone seen by each photoelectric element, wherein the second vision angle (β) is greater than the first vision angle (α).

17. Apparatus for the optical recognition of documents comprising:

a first photoelectric element which senses light reflected from a first region of a zone across a document;

a second photoelectric element which senses a second region of said zone wherein the first region at least partially overlaps the second region; and wherein the first and second photoelectric elements each have a first vision angle (α) which determines the width of each region and a second vision angle (β) which determines the length of each region, and further comprising first and second photoelectric elements which sense light transmitted through said first and second regions, respectively.

18. The apparatus of claim 17 wherein the second vision angle (β) is greater than the first vision angle (α).

19. The apparatus of claim 17 wherein the first and second photoelectric elements generate signals for evaluation.

20. The apparatus of claim 17 further comprising a transporter which transfers a document into the proximity of the photoelectric sensors.

21. The apparatus of claim 17 further comprising a plurality of light sources for illuminating the first and second regions.

22. The apparatus of claim 21 further comprising an evaluation unit for evaluating the signals generated by the photoelectric elements.

23. Apparatus for the optical recognition of documents comprising:

a transport system for transferring a document along a document transport surface;

a plurality of photoelectric elements arranged in a spaced apart arrangement to sense light from a region of said document; and a plurality of light sources ordered in periodically alternating color, wherein at least the light sources of a first color have a different light emission intensity than the light sources of a second color and at least the light sources of said first color being ordered with a first periodicity that is different than the periodicity of the light sources of the second color, thereby achieving a uniform illumination of said region.

* * * * *

UNITED STATES PATENT AND TRADEMARK OFFICE
CERTIFICATE OF CORRECTION

PATENT NO. : 5,498,879

DATED : March 12, 1996

INVENTOR(S) : Ivo De Man

It is certified that error appears in the above-identified patent and that said Letters Patent is hereby corrected as shown below:

In the Abstract, line 4, cancel "Create" and substitute --create--.

In the Abstract, line 21, cancel "signals. optical" and substitute --signals. An optical--.

Col. 1, line 29, cancel "Solor" and substitute --color--.

Col. 3, line 60, after "signal", delete the comma ",".

Col. 4, line 29, after "plane", insert --5--.

Col. 4, line 63, cancel "21" and substitute --21A--.

Col. 5, line 41, cancel "and" and substitute --of--.

Col. 6, line 17, cancel "$\alpha$, $\beta$" and substitute --$\alpha'$, $\beta'$--.

Col. 6, line 18, after "30", insert a period --.--.

Col. 7, line 4, after "planes", insert --11,--.

UNITED STATES PATENT AND TRADEMARK OFFICE

CERTIFICATE OF CORRECTION

PATENT NO. : 5,498,879

DATED : March 12, 1996

INVENTOR(S) : Ivo De Man

It is certified that error appears in the above-identified patent and that said Letters Patent is hereby corrected as shown below:

Col. 7, line 62, cancel "US-U3" and insert --U1-U3--.

Col. 10, line 39, (claim 23) cancel "color" and substitute --colors--.

Signed and Sealed this

Tenth Day of March, 1998

Attest:

BRUCE LEHMAN

*Attesting Officer* *Commissioner of Patents and Trademarks*